(12) United States Patent
Doi et al.

(10) Patent No.: US 7,672,494 B2
(45) Date of Patent: Mar. 2, 2010

(54) PROCESSING MEDICAL IMAGE INFORMATION TO DETECT ANATOMICAL ABNORMALITIES

(75) Inventors: Takeshi Doi, Cupertino, CA (US); Wei Zhang, Union City, CA (US)

(73) Assignee: Hologic, Inc., Marlborough, MA (US)

( * ) Notice: Subject to any disclaimer, the term of this patent is extended or adjusted under 35 U.S.C. 154(b) by 923 days.

(21) Appl. No.: 11/419,980

(22) Filed: May 23, 2006

(65) Prior Publication Data
US 2007/0274578 A1 Nov. 29, 2007

(51) Int. Cl.
*G06K 9/00* (2006.01)
*A61B 6/04* (2006.01)
(52) U.S. Cl. .......................................... 382/128; 378/37
(58) Field of Classification Search ................. 382/128, 382/129, 130, 131, 132, 133, 134; 378/4, 378/6, 37, 46, 63, 90, 92, 98.4, 98.6, 98.9, 378/101, 140; 128/915, 922; 600/407, 425
See application file for complete search history.

(56) References Cited

U.S. PATENT DOCUMENTS

| | | | |
|---|---|---|---|
| 5,729,620 A * | 3/1998 | Wang | 382/128 |
| 5,815,591 A | 9/1998 | Roehrig | |
| 5,917,929 A | 6/1999 | Marshall | |
| 6,035,056 A * | 3/2000 | Karssemeijer | 382/132 |
| 6,075,879 A | 6/2000 | Roehrig | |
| 6,266,435 B1 | 7/2001 | Wang | |
| 6,301,378 B1 * | 10/2001 | Karssemeijer et al. | 382/132 |
| 6,434,262 B2 | 8/2002 | Wang | |
| 6,901,156 B2 | 5/2005 | Giger | |
| 6,925,200 B2 * | 8/2005 | Wood et al. | 382/132 |
| 7,308,126 B2 * | 12/2007 | Rogers et al. | 382/132 |
| 7,599,534 B2 * | 10/2009 | Krishnan | 382/128 |

FOREIGN PATENT DOCUMENTS

WO WO 02/45437 A2 6/2002

* cited by examiner

*Primary Examiner*—Abolfazl Tabatabai
(74) *Attorney, Agent, or Firm*—Brian J. Daiuto

(57) ABSTRACT

A method, system, and related computer program products are provided for processing a medical image of a body part according to a computer-aided detection (CAD) algorithm, the medical image having an image border, the body part comprising imaged tissue appearing inside the image border and outlying tissue not appearing in the medical image, wherein likely anatomical abnormalities in the outlying tissue near the imaged tissue border are detected by the CAD algorithm. In one example, the detected likely abnormalities in the outlying tissue are located within a first distance from the imaged tissue border, wherein the first distance corresponds to a spatial ambit of a neighborhood-based feature computed by the CAD algorithm.

20 Claims, 4 Drawing Sheets

US 7,672,494 B2

PROCESSING MEDICAL IMAGE INFORMATION TO DETECT ANATOMICAL ABNORMALITIES

FIELD

This patent specification relates to the processing of medical images for detecting anatomical abnormalities.

BACKGROUND

Computer-aided detection (CAD) generally refers to the use of computers to analyze medical images to detect anatomical abnormalities in the subject body part. Sometimes used interchangeably with the term computer-aided detection are the terms computer-aided diagnosis, computer-assisted diagnosis, or computer-assisted detection. Upon acquisition of a digital or digitized medical image, a CAD algorithm usually identifies a preliminary set of candidate locations in a medical image and then selects which ones, if any, will qualify as actual CAD detections based on a variety of computed features associated with the candidate detections. The CAD results are most often communicated in the form of annotation maps comprising graphical annotations (CAD markers) overlaid on a diagnostic-quality or reduced-resolution version of the medical image, one CAD marker for each CAD detection.

CAD results are mainly used by radiologists as "secondary reads" or secondary diagnosis tools. When analyzing a medical image, the radiologist usually makes his or her own analytical determinations before looking at the CAD results, which either verify those determinations or trigger further inspection of the image. Some CAD implementations have used CAD results in a "concurrent reading" context in which the radiologists look at the CAD results at the same time that they look at the images.

In the field of x-ray mammography, thousands of x-ray mammography CAD systems are now installed worldwide, and are used to assist radiologists in the interpretation of millions of mammograms per year. X-ray mammography CAD systems are described, for example, U.S. Pat. No. 5,729,620, U.S. Pat. No. 5,815,591, U.S. Pat. No. 5,917,929, U.S. Pat. No. 6,075,879, U.S. Pat. No. 6,266,435, U.S. Pat. No. 6,301,378, U.S. Pat. No. 6,434,262, U.S. Pat. No. 6,901,156, and WO 2002/045437A2, each of which is incorporated by reference herein. X-ray mammography CAD algorithms analyze digital or digitized images of standard mammographic views (e.g. CC, MLO) for characteristics commonly associated with breast cancer, such as calcifications, masses, and architectural distortions.

Although at least one preferred embodiment is described herein in the context of x-ray mammography CAD systems, it is to be appreciated that the present teachings are applicable for a variety of present or prospective medical imaging modalities (e.g., CT, MRI, PET, SPECT, ultrasound, x-ray tomosynthesis, thermography, electrical conductivity-based modalities, and other modalities) for a variety of different body parts (e.g., head, neck, chest, abdomen, etc.) It would be desirable to provide a CAD system having enhanced functionality with respect to one or more of anatomical coverage, information usage completeness, and overall screening effectiveness. It would be further desirable to provide a CAD user interface accommodating such enhanced functionality. Other issues arise as would be apparent to one skilled in the art upon reading the present disclosure.

SUMMARY

A method, system, and related computer program products are provided for processing a medical image of a body part according to a computer-aided detection (CAD) algorithm, the medical image having an image border, the body part comprising imaged tissue appearing inside the image border and outlying tissue not appearing in the medical image, wherein likely anatomical abnormalities in the outlying tissue near the imaged tissue border are detected by the CAD algorithm. In one example, the detected likely abnormalities in the outlying tissue are located within a first distance from the imaged tissue border, wherein the first distance corresponds to a spatial ambit of a neighborhood-based feature computed by the CAD algorithm. Preferably, suspected abnormalities in the imaged tissue are also detected by the CAD algorithm, and an annotated map is created comprising symbols identifying suspected abnormalities in both the imaged tissue and the outlying tissue. A display is provided that displays both the medical image and the annotation map.

For one preferred embodiment, the medical image is an x-ray mammogram, and the outlying tissue corresponds to tissue abutting the chest wall that was not captured in the x-ray mammogram. An extended region is defined that extends a predetermined distance outward from a chest wall edge of the x-ray mammogram, and at least one neighborhood-based feature is computed for at least one candidate location in the extended region. Along with other candidate locations both inside the image border and in the extended region, the at least one candidate location is classified and labeled as a suspected abnormality if warranted according to the classification algorithm and the at least one neighborhood-based feature.

DETAILED DESCRIPTION

Figure 1:
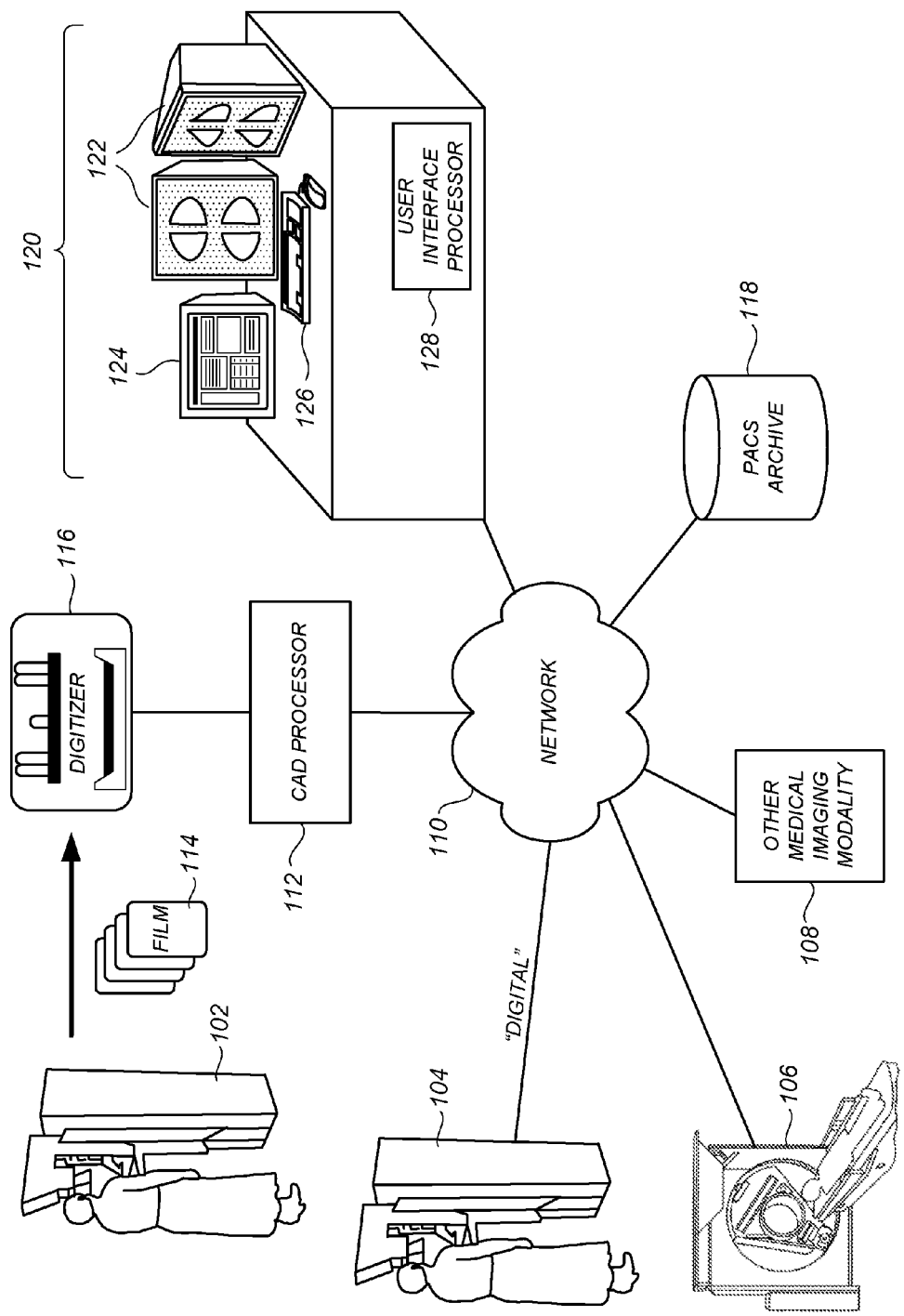
FIG. 1 illustrates a conceptual diagram of a medical imaging environment including a CAD processor according to a preferred embodiment.

FIG. 1 illustrates a conceptual diagram of a medical imaging environment for which one or more of the preferred embodiments is particularly suited. Shown in FIG. 1 is a network 110, which may be a HIS/RIS (Hospital Information System/Radiology Information System) network, to which is coupled a film mammogram acquisition device 102, a digital mammogram acquisition device 104, a computed tomography (CT) acquisition device 106, and a generalized "other"

medical imaging device 108. A computer-aided detection (CAD) processor 112 coupled to the network 110 receives digital medical images from one or more of the devices 104-108, and/or from a digitizer 116 that digitizes x-ray mammogram films 114 generated by the film mammogram acquisition device 102. The CAD processor 112 processes the medical images according to the CAD processing algorithm described hereinbelow. The medical images are then viewed in conjunction with the associated CAD results at a radiology review workstation 120.

Preferably, the various medical images and related information are communicated according to the DICOM (Digital Imaging and Communications in Medicine) standard and the network 110 supports the TCP/IP protocol, which is used as the transport protocol for the DICOM standard. Also coupled to the network 110 is a PACS (Picture Archiving and Communication System) archive 118, generally representing a repository for medical information associated with the medical imaging environment, including both current and archived images, current and archived CAD results, radiology reports for completed cases, and so forth.

As indicated by the presence of the CT acquisition device 106 and the "other" medical imaging device 108 in FIG. 1, the preferred embodiments described herein are readily applicable for a variety of present or prospective non-mammography medical imaging modalities such as CT, MRI, PET, SPECT, ultrasound, x-ray tomosynthesis, thermography, electrical conductivity-based modalities, and other modalities. In the field of chest CT imaging, at least one CAD system has been commercialized for assisting radiologists in the detection of suspicious lung nodules, such systems being referenced herein as lung-CT CAD systems. Examples of lung-CT CAD systems are described in U.S. Pat. No. 5,881,124 and in the commonly assigned U.S. Pat. No. 6,925,200, each of which is incorporated by reference herein.

The preferred embodiments described herein are seamlessly layered upon an existing CAD workflow, in which the digital or digitized medical images are processed by the CAD processor 112, and in which the medical images and their related CAD results are subsequently displayed at the review workstation 120 to a viewer, who makes a clinical determination therefrom. The clinical determination can be in relation to screening, diagnosis, follow-up, or any of a variety of other activities. Review workstation 120 comprises a diagnostic display 122, an administrative display 124, user input devices 126 (e.g., keyboard, mouse, trackball, pointers, etc), and a user interface processor 128. Administrative display 124 is used for input and output of a wide variety of information that may be associated with a particular set of medical images (e.g., listings, tables, plots, text descriptions, etc), as well as for system installation, maintenance, updating, and related tasks.

Notably, the medical imaging environment of FIG. 1 is presented by way of example only and is not intended to limit the scope of the preferred embodiments to this particular scenario. By way of example, different combinations of the devices of FIG. 1 can be placed adjacently to each other or integrated into the same hardware boxes without departing from the scope of the preferred embodiments.

Figure 2:
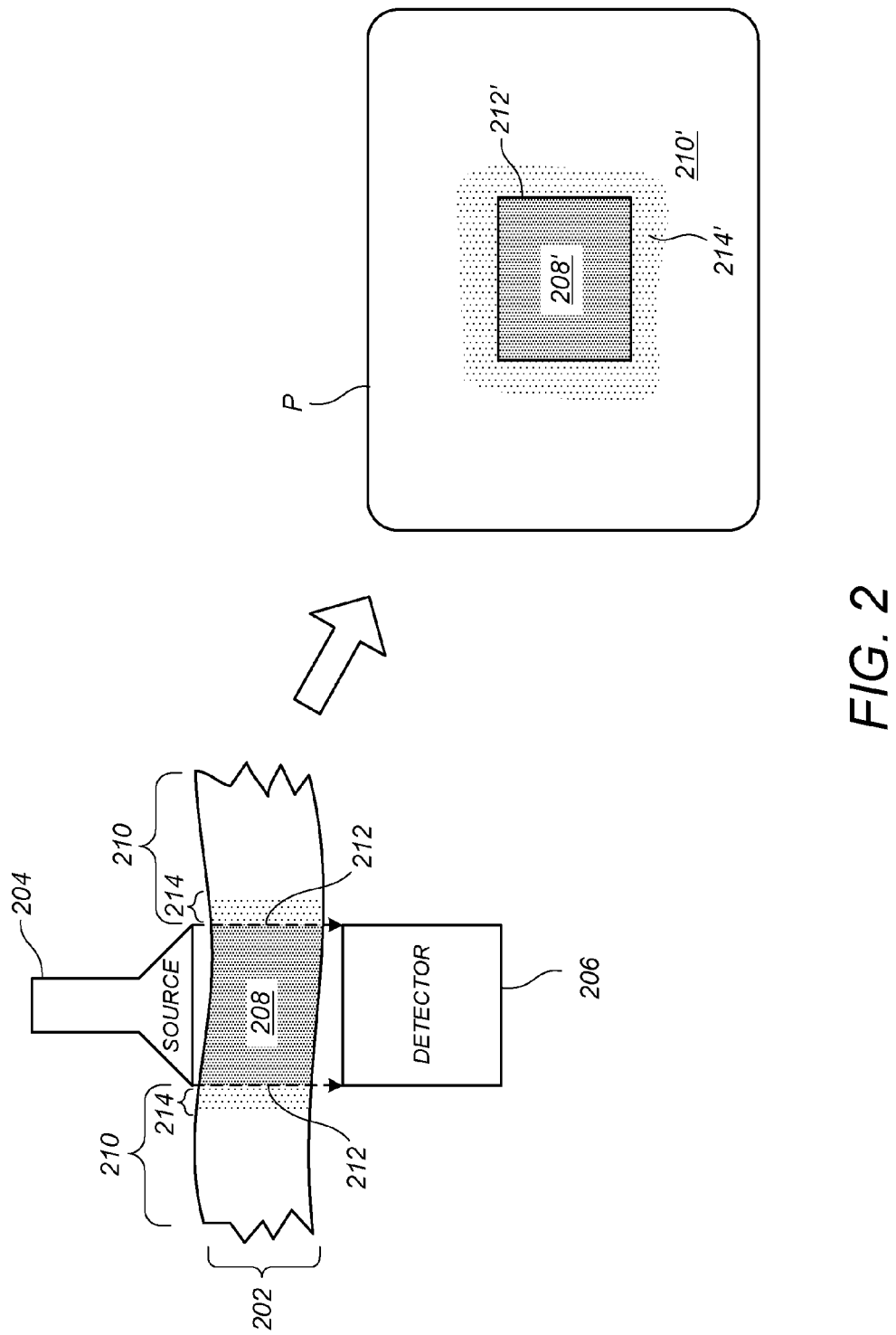
FIG. 2 illustrates conceptual diagrams of imaged tissue, outlying tissue, an imaged tissue border, a medical image, and a medical image border.

FIG. 2 illustrates conceptual diagrams of imaged tissue, outlying tissue, an imaged tissue border, a medical image, and a medical image border for the purposes of describing one or more of the preferred embodiments herein. For capturing a medical image of a generic body part 202, a source 204 produces interrogating signals that pass through the body part 202 and are captured by a detector 206. In one particular example, the body part 202 may be a breast, the source 204 may be an x-ray source, the interrogating signals may be x-rays, and the detector 206 may be an x-ray mammography detector. However, for other examples the source 204/detector 206 may be for optical, acoustic, magnetic resonance, thermal, or other imaging modalities, and there may be different relative positions of the source 204, detector 206, and body part 202. For clarity of description, the preferred embodiments herein are described in terms of an x-ray mammography scenario, although the scope of the preferred embodiments is not so limited.

As illustrated in FIG. 2, for any particular medical imaging procedure, the body part 202 usually comprises imaged tissue 208 that is captured by the medical imaging process and outlying tissue 210 that is not captured by the medical imaging process, with an imaged tissue border 212 existing therebetween. Included in the outlying tissue 210 is a region 214 located near the imaged tissue border 212. Also illustrated in FIG. 2 is a hypothetical output plane P comprising a medical image 208' of the imaged tissue 208, the medical image 208' being surrounded by an image border 212' corresponding to the imaged tissue border 212. Outside the image border 212' is an empty outlying region 210 corresponding to the outlying tissue 210, including an empty outlying region 214 near the image border 212'.

Because the outlying tissue 210 was not actually imaged, prior art CAD algorithms have generally ignored it, and have only generated CAD results for tissue lying inside the imaged tissue border 212 and have only provided CAD marks within the image border 212'. However, for one or more of the preferred embodiments, it is recognized that the medical image 208' can actually contain useful information about the outlying tissue 214 located near the imaged tissue border 212. According to a preferred embodiment, information in the medical image 208' is processed to identify suspected abnormalities in the outlying tissue 214 located near the imaged tissue border 212, and corresponding CAD marks are provided on the user display that are indicative of the type and location of the outlying suspected abnormalities. This information can then be used in beneficial ways, such as to indicate a need for follow-up medical imaging, to indicate the need for a biopsy, and so on. As with standard CAD results for locations within the medical image 208', it is preferred that the CAD marks for the outlying tissue 214 be provided as a "second look" after the radiologist has independently examined the medical image 208'.

Generally speaking, the outlying tissue 214 for which CAD results can be provided is within a predetermined distance from the imaged tissue border 212. For one preferred embodiment, this predetermined distance corresponds to a lateral ambit of at least one neighborhood-based feature used in the CAD algorithm. For example, if a particular neighborhood-based feature considers a neighborhood of radius R around a candidate pixel, then the outlying tissue 214 for which CAD results can be provided is within a distance R from the imaged tissue border 212 as measured in the image plane P.

Figure 4:
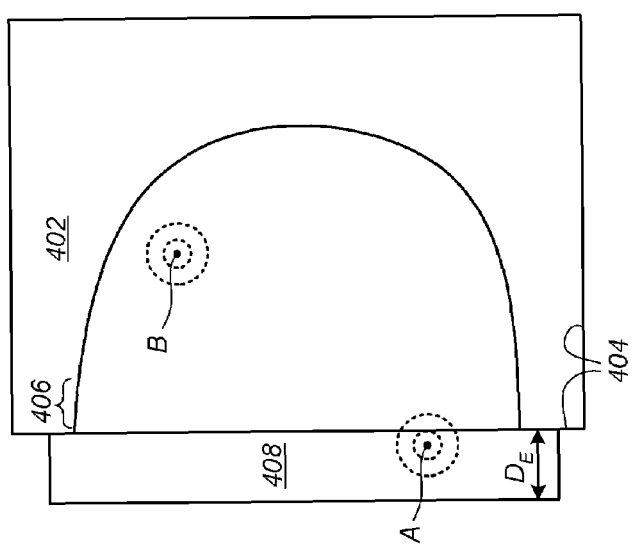
FIG. 4 illustrates a medical image, an extended region, and candidate locations according to a preferred embodiment.
Figure 3:
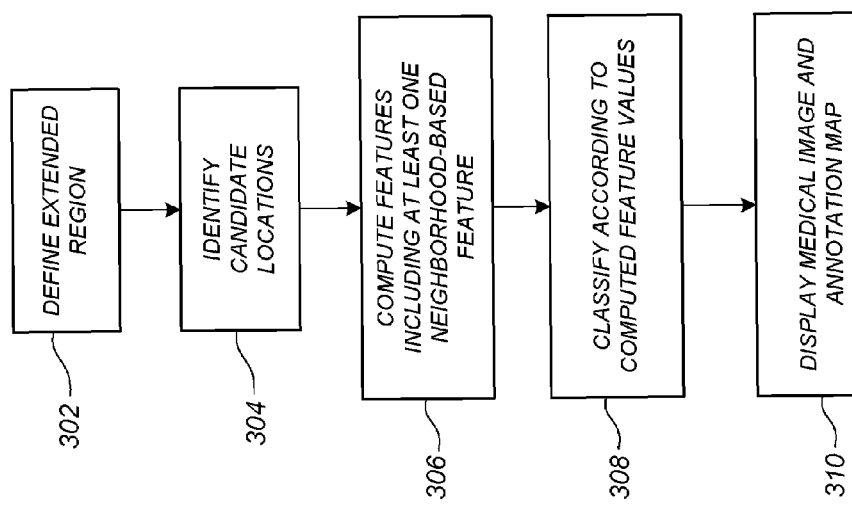
FIG. 3 illustrates a method for computer-aided detection of anatomical abnormalities according to a preferred embodiment.

FIG. 3 illustrates a method for computer-aided detection of anatomical abnormalities according to a preferred embodiment. At step 302, an extended region beyond the image border is defined. The shape and location of the extended region will depend on the particular type of medical image. For the particular example of x-ray mammography, FIG. 4 illustrates a medical image 402 that is a craniocaudal view of the left breast that includes a region 406 that is close to a chest wall of the patient, the region 406 ending at an image border 404. For this case, an extended region 408 is defined that extends a distance $D_E$ outward toward the patient's chest wall.

At step 304, candidate locations in the medical image 402 and the extended region 408 are identified, with two exemplary candidate locations A and B being shown in FIG. 4. At step 306, at least one neighborhood-based feature is computed at each candidate location. The candidate locations can be selected according to any of a variety of methods, ranging from a "brute-force" method in which the neighborhood-based features are computed for every pixel in the region, to so-called "forward" methods in which candidate locations are more selectively identified, to various combinations of brute-force and forward algorithms. One example of a suitable forward method is described in U.S. Pat. No. 5,815,591, supra, wherein a line and direction image is computed from the medical image, then certain trapezoidal "regions of potential intersection" are projected from the lines according to their directions and accumulated in a cumulative array, and then candidate locations are identified from local maxima in the cumulative array. For such computations, the cumulative array is extended into the extended region 408 such that local maxima can be formed there if there are sufficient lines pointing there from within the image border 404.

Figure 5:
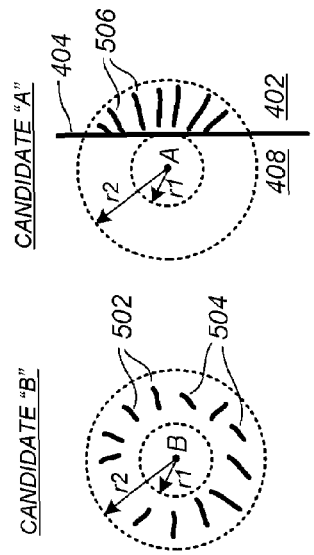
FIG. 5 illustrates conceptual diagrams related to computation of a neighborhood-based feature according to a preferred embodiment.

As used herein, neighborhood-based feature refers to any CAD feature that at least partially characterizes a candidate location and that is computed using values from a substantial neighborhood therearound. Examples of neighborhood-based features include, but are not limited to, the stellateness magnitude and isotropy metrics described in U.S. Pat. No. 6,301,378, supra. FIG. 5 illustrates conceptual diagrams related to computation of the stellateness magnitude metric around each of the candidate locations A and B, such feature being proportional to the number of pixels in an annulus of inner radius r1 and outer radius r2 therearound for which the line image contains lines that point generally toward the center. Thus, for example, the lines 502 in FIG. 5 would contribute to the stellateness magnitude metric for candidate location B while the lines 504 would not. As illustrated in FIG. 5, the candidate location A, which is centered in the extended region 408 outside the medical image 402, can have a significant stellateness magnitude metric even though the lines 506 pointing toward the center are only present on the right side of the image border 404 (i.e., are only present in the medical image 402 itself).

The outer radius r2 represents the lateral ambit of the stellateness magnitude metric and may be, for example, about 1.6 cm. In a simplified scenario for which the stellateness magnitude metric is the only neighborhood-based metric used by the CAD algorithm, the distance $D_E$ for the extended region 408 is therefore preset to about 1.6 cm, because any points farther away from the image border 404 would never accumulate any values for that metric. In the more realistic scenario in which there are several neighborhood features computed for each candidate location, the distance $D_E$ for the extended region 408 is preset to the largest ambit of the several features. In addition to the at least one neighborhood-based feature, other features are computed for the candidate locations that are collectively sufficient for classification purposes in conjunction with the at least one neighborhood-based feature. Examples include mass eccentricity, sphericity, elongation, border contrast, and a variety of other features as described in one or more of the incorporated references, supra.

With reference again to FIG. 3, at step 308 the candidate locations are classified according to their computed features using any of a variety of known methods (e.g., linear classifiers, neural networks, etc.). Finally, at step 310, an output display is generated including the medical image and, for each identified likely abnormality, at least one annotation that communicates a location thereof relative to the imaged tissue.

Figure 7:
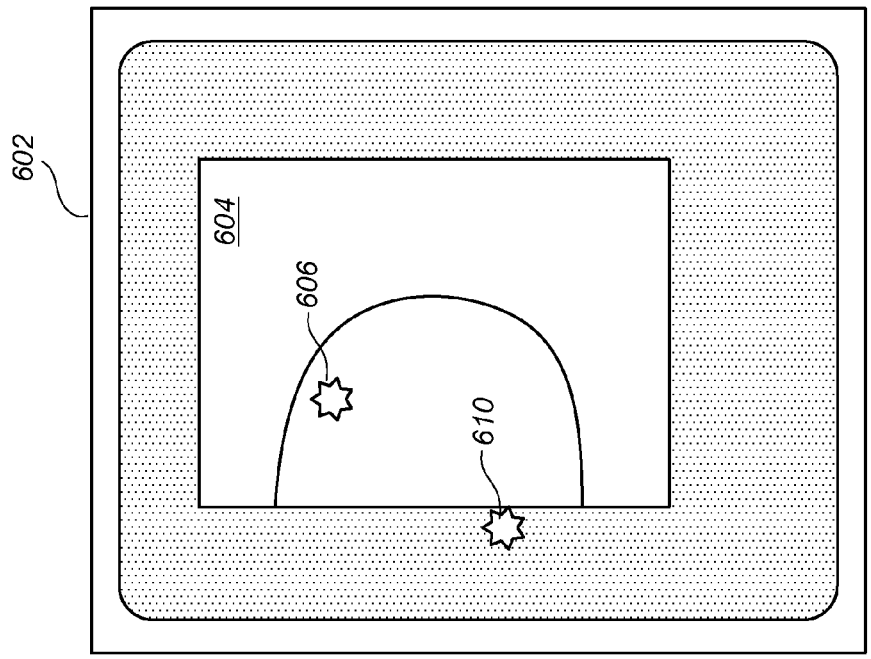
FIGS. 6-7 illustrate medical image displays including CAD annotations according to one or more preferred embodiments.
Figure 6:
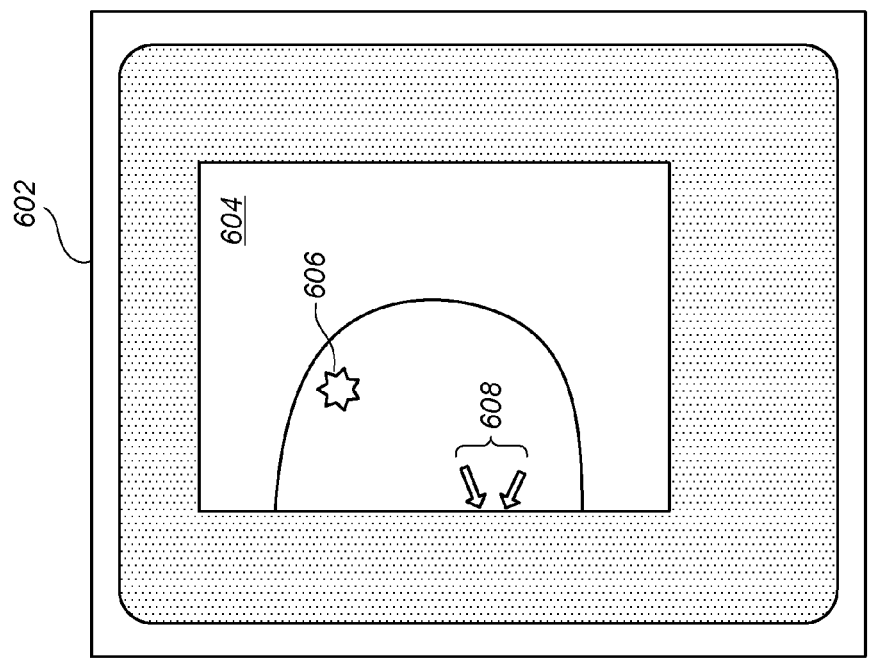

FIGS. 6-7 illustrate medical image displays including CAD annotations according to one or more preferred embodiments. For the embodiment of FIG. 6, a display monitor 602 displays a medical image 604 and an annotation map comprising the CAD marks 606 and 608, wherein the CAD mark 608 comprises arrows pointing to the off-image center location of the suspected abnormality. Alternatively, in the preferred embodiment of FIG. 7, an actual CAD marker 610 is placed off-image at a location corresponding to the computed center of the suspected abnormality within the extended region. Optionally, an outline of the extended region itself can be superimposed, but of course no pixel values can be shown there because no tissue there was imaged.

Whereas many alterations and modifications of the preferred embodiments will no doubt become apparent to a person of ordinary skill in the art after having read the foregoing description, it is to be understood that the particular embodiments shown and described by way of illustration are in no way intended to be considered limiting. By way of example, although one or more of the preferred embodiments supra is described in the context of two-dimensional medical imaging, the present teachings are readily applied in three-dimensional medical imaging contexts and other multi-dimensional medical imaging contexts (e.g., tomosynthesis). Thus, reference to the details of the described embodiments are not intended to limit their scope, which is limited only by the scope of the claims set forth below.

What is claimed is:

1. A method for detecting anatomical abnormalities in a body part, the body part including (i) an imaged tissue region captured in a medical image by a medical imaging process, and (ii) a non-imaged tissue region not captured in the medical image by the medical imaging process, the non-imaged tissue region of the body part adjacently outlying the imaged tissue region of the body part with respect to the medical imaging process, the method being implemented by a computing device comprising at least one processor and memory, comprising:

receiving, by the computing device, the medical image; and processing, by the computing device, the medical image to identify likely anatomical abnormalities centered in the non-imaged tissue region of the body part, wherein said processing the medical image comprises:

defining a first image array that includes both (i) the medical image and (ii) an extended region adjacently outlying the medical image, the extended region being spatially representative of the non-imaged tissue region, the extended region being devoid of image information captured in the medical imaging process; and processing the first image array according to a computer-aided detection (CAD) algorithm, including computing at least one neighborhood-based CAD feature for at least one location in said extended region.

2. The method of claim 1, further comprising:

displaying the medical image; and for each identified likely anatomical abnormality in the non-imaged tissue region, displaying at least one annotation that communicates a location thereof relative to the imaged tissue region.

3. The method of claim 2, further comprising displaying said extended region adjacent to the medical image, wherein said at least one annotation comprises a visible marker positioned on the extended region at a location corresponding to a computed location of the anatomical abnormality in the non-imaged tissue region.

4. The method of claim 3, further comprising:
processing the medical image to identify likely anatomical abnormalities in the imaged tissue region; and
for each identified likely anatomical abnormality in the imaged tissue region, displaying at least one annotation that communicates a location thereof within the imaged tissue region.

5. The method of claim 1, wherein said processing the first image array according to the CAD algorithm comprises:
identifying a first candidate location in said extended region; and
computing the at least one neighborhood-based CAD feature for the identified first candidate location.

6. The method of claim 5, said processing the first image array according to the CAD algorithm further comprising:
identifying a plurality of additional candidate locations within the first image array;
computing said at least one neighborhood-based CAD feature for each of said additional candidate locations; and
applying a classification algorithm to said first and additional candidate locations, said classification algorithm being based at least upon said at least one neighborhood-based CAD feature.

7. The method of claim 5, wherein said identifying the first candidate location comprises:
processing the first image array to identify candidate locations therein using a forward projection and accumulation method, wherein an accumulation region associated with said forward projection and accumulation method includes said extended region; and
thresholding said accumulation region.

8. The method of claim 5, wherein said medical image comprises an x-ray mammogram, wherein said extended region corresponds to chest wall tissue not captured in the x-ray mammogram, and wherein said at least one neighborhood-based CAD feature comprises a mass stellateness feature.

9. The computer-implemented method of claim 8, said defining said first image array comprising defining said extended region as extending a predetermined distance outward from a chest wall edge of the x-ray mammogram.

10. A system comprising:
a source of a medical x-ray image of a body part in digital form, the medical x-ray image having an image border, the body part comprising imaged tissue appearing inside the image border and non-imaged tissue adjacently outlying the imaged tissue, the non-imaged tissue not appearing in the medical x-ray image;
a processor processing said medical x-ray image digitally to detect suspected abnormalities in both the imaged tissue and the non-imaged tissue, said processor creating as a result of said processing an annotated map comprising symbols identifying the suspected abnormalities by type and location, wherein said processing comprises:
defining a first image array that includes both (i) the medical x-ray image and (ii) an extended region adjacently outlying the medical x-ray image, the extended region being spatially representative of the non-imaged tissue adjacently outlying the imaged tissue; and
processing the first image array according to a computer-aided detection (CAD) algorithm, including computing at least one neighborhood-based CAD feature for at least one location in said extended region;
and
a display coupled with said processor to display the medical x-ray image, the extended region, and the annotation map.

11. The system of claim 10, wherein said processing the first image array according to the CAD algorithm further comprises:
identifying a first candidate location in the extended region; and
computing the at least one neighborhood-based CAD feature for the identified first candidate location.

12. The system of claim 11, wherein said processing the first image array according to the CAD algorithm further comprises:
identifying a plurality of additional candidate locations within the first image array;
computing said at least one neighborhood-based CAD feature for each of said additional candidate locations; and
applying a classification algorithm to said first and additional candidate locations, said classification algorithm being based at least upon said at least one neighborhood-based CAD feature.

13. The system of claim 11, wherein said identifying the first candidate location comprises:
processing the first image array to identify candidate locations therein using a forward projection and accumulation method, wherein an accumulation region associated with said forward projection and accumulation method includes said extended region; and
thresholding said accumulation region.

14. The system of claim 11, wherein said medical x-ray image comprises an x-ray mammogram, wherein said extended region corresponds to chest wall tissue not captured in the x-ray mammogram, and wherein said at least one neighborhood-based CAD feature comprises a mass stellateness feature.

15. The system of claim 14, said defining said first image array comprising defining said extended region as extending a predetermined distance outward from a chest wall edge of the x-ray mammogram.

16. A computer program product embodied in a computer-readable medium for detecting anatomical abnormalities in a body part, the body part including (i) an imaged tissue region captured in a medical image by a medical imaging process, and (ii) a non-imaged tissue region not captured in the medical image by the medical imaging process, the non-imaged tissue region of the body part adjacently outlying the imaged tissue region of the body part with respect to the medical imaging process, comprising:
computer code for receiving the medical image; and
computer code for processing the medical image to identify likely anatomical abnormalities centered in the non-imaged tissue region of the body part, comprising:
computer code for defining a first image array that includes both (i) the medical image and (ii) an extended region adjacently outlying the medical image, the extended region being spatially representative of the non-imaged tissue region, the extended region being devoid of image information captured in the medical imaging process; and
computer code for processing the first image array according to a computer-aided detection (CAD) algorithm, including computing at least one neighborhood-based CAD feature for at least one location in said extended region.

17. The computer program product of claim 16, further comprising:
  computer code for displaying the medical image; and
  computer code for displaying, for each identified likely anatomical abnormality in the non-imaged tissue region, at least one annotation that communicates a location thereof relative to the imaged tissue region.

18. The computer program product of claim 17, further comprising:
  computer code for processing the medical image to identify likely anatomical abnormalities in the imaged tissue region; and
  computer code for displaying, for each identified likely anatomical abnormality in the imaged tissue region, at least one annotation that communicates a location thereof within the imaged tissue region.

19. The computer program product of claim 16, wherein said computer code for processing the first image array according to the CAD algorithm comprises:
  computer code for identifying a first candidate location in said extended region; and
  computer code for computing the least one neighborhood-based CAD feature for the identified first candidate location.

20. The computer program product of claim 19, further comprising:
  computer code for identifying a plurality of additional candidate locations within the first image array;
  computer code for computing said at least one neighborhood-based CAD feature for each of said additional candidate locations; and
  computer code for applying a classification algorithm to said first and additional candidate locations, said classification algorithm being based at least upon said at least one neighborhood-based CAD feature.

* * * * *

UNITED STATES PATENT AND TRADEMARK OFFICE
CERTIFICATE OF CORRECTION

| | | |
|---|---|---|
| PATENT NO. | : 7,672,494 B2 | Page 1 of 1 |
| APPLICATION NO. | : 11/419980 | |
| DATED | : March 2, 2010 | |
| INVENTOR(S) | : Takeshi Doi et al. | |

It is certified that error appears in the above-identified patent and that said Letters Patent is hereby corrected as shown below:

Col. 10, Line 3:   Insert --at-- immediately before "least"

Signed and Sealed this

Fifteenth Day of June, 2010

David J. Kappos
*Director of the United States Patent and Trademark Office*